United States Patent Office 2,998,401
Patented Aug. 29, 1961

2,998,401
POLYETHYLENE COATING COMPOSITION
Genevieve Reavis, Swarthmore, and Charles M. Rosser, Wallingford, Pa., assignors to American Viscose Corporation, Philadelphia, Pa., a corporation of Delaware
No Drawing. Filed Aug. 21, 1958, Ser. No. 756,292
10 Claims. (Cl. 260—32.8)

This invention relates to the art of moistureproofing hydrophilic base films such as regenerated cellulose. In particular, it relates to compositions which are essentially polyethylene for coating such films.

Polyethylene is currently being used extensively as a material for coating base films, such as films of regenerated cellulose, for use as moistureproof packaging materials. At present, the greater portion of polyethylene-coated films are produced by melt-extruding the coating upon a cellophane which preferably contains an anchoring material such as a melamine-formaldehyde resin or other anchoring agents well-known to the coating art. Melt-extrusion in its present state is limited to forming coatings which are not substantially less than ½ mil in thickness. In comparison, standard coatings comprising nitrocellulose, a wax, and a plasticizer are in order of 0.05 mil in thickness. In general, the melt spinning process is preferably conducted with uncompounded polymer, since compounding it usually produces changes in viscosity of the melt which complicate the process. Most ingredients reduce the viscosity of the melt and can cause difficulty of various sorts. Many ingredients, which are otherwise desirable, decompose, degrade, polymerize, or volatilize at the extrusion temperatures of polyethylene, i.e., in the neighborhood of 600° F.

Forming of polyethylene coatings by application of solutions thereof to a base film may be readily accomplished, but coatings are difficult to obtain having a thickness greater than about 0.2 mil. At this thickness, uncompounded polyethylene has a moisture vapor transmission rate of approximately 100 grams per square meter per 24 hours which is unacceptable in many uses of wrapping materials. On account of the general incompatibility of polyethylene for other organic resins, plasticizers, solvents, etc., it has been very difficult to find organic materials which will mix with polyethylene to effectively modify undesirable characteristics thereof. For example, one common result of incompatibility of a compound with polyethylene is an obvious reduction in the clarity of the composition as the result of crystallization of the added compound.

A primary object of the present invention is to substantially lower the moisture vapor transmission rate (referred to hereinafter as MVTR) of polyolefins, particularly polyethylene. A further object is to make commercially practical the coating of hydrophilic bases with compositions essentially polyethylene to obtain films of high resistance to moisture transmission. Another object is to make possible the use of thinner polyethylene coatings on base films than have been heretofore practical by providing polyethylene compositions having substantially greater moisture vapor resistance.

Other objects, features and advantages will become more apparent from the following description of the invention.

In accordance with the present invention, compositions which are especially suited for coating films of regenerated cellulose and provide unusually high resistance to the transmission of moisture may be prepared as a mixture of from 90 to 70 parts of a film-forming grade of a polyolefin, particularly polyethylene, and from 10 to 30 parts of a higher fatty ketone of which stearone is a preferred ketone, and a solvent for both ingredients such as cumene (isopropyl benzene).

The term "higher fatty ketones" as used in describing this invention include ketones having the formula

wherein R and R′ are alkyl radicals containing between 1 and 30 carbon atoms, and the ketone molecule may comprise dissimilar alkyl groups within this range. Other examples of higher alkyl ketones suitable for this invention include laurone ($C_{23}H_{46}O$), myristone ($C_{27}H_{54}O$), behenone ($C_{43}H_{86}O$), cerotone ($C_{51}H_{102}O$), montanone ($C_{55}H_{110}O$), melissone ($C_{61}H_{122}O$), etc.

The higher fatty ketones may be used advantageously with all film-forming grades of polyethylene through the density range of from 0.92 to 0.96. The lower end of this range characterizes the low-melting polymer presently manufactured in large quantities whereas the upper end of the range identifies the more recently developed polymers such as manufactured by the well-known Zeigler, Phillips and du Pont processes.

The forming of film-like elements, whether they be coatings or films, from the polyolefin-ketone mixtures herein described may be accomplished by solution, emulsion, or hot-melt techniques. However, because of the thinness in which such elements may be formed to provide the low MVTRs desired, the invention is most advantageously employed through solution application which is the best method by which to form coatings of 0.2 mil or less. As elements of this order of thickness do not have sufficient strength to be used independently of a base film, the primary utility of the compositions of this invention is in the field of coatings, particularly as transparent coatings for wrapping materials. The solutions may be applied to base film by processes involving spreading, spraying, reverse roll coating, or dipping procedures.

Solutions of any of the various grades of polyethylene, or other polyolefins, and the higher fatty ketone used therewith suitable for coating a base film are readily prepared as solutions in solvents such a cumene, xylene, decalin, or tetralin. From the standpoint of achieving thin coatings, i.e., in the range of 0.05 to 0.2 mil in thickness, solutions having overall concentrations of the solid ingredients (polyethylene and the ketone) in the range of from 3 to 10 percent are considered most workable, preferably about 5 to 6 percent. For further control of the viscosity and the thickness of the coating, the solutions may be applied at any desired elevated temperature below the boiling point of the solvent.

As is the case generally when coating cellulosic films with polyethylene or compositions that are essentially polyethylene, the compositions herein described adhere more firmly to the base film if it contains one of the so-called anchoring agents. Typical of such agents are precondensates of melamine-formaldehyde, urea-formaldehyde, and resorcinol-formaldehyde resins incorporated into the base film in a water-dispersible, incompletely-condensed form and later, with the coating in place on the base film, condensed to a water-insoluble state wherein it links or bonds the coating firmly to the base film.

While the data hereinbelow presented illustrates most dramatic improvement of the polymers in the low end of the density range by use of the higher fatty ketones, substantial reduction of vapor transmission is clearly shown in the use of the ketones with the higher density polymers. It is indicated by this data that a critical ratio characterizing a transition point is reached in the relative amounts of polyolefin and ketone in the range of from 90 to 85 parts polyolefin and from 10 to 15 parts of the ketone. As the percentage of ketone is increased up to the critical value or transition point, only small perceptible increases in the reduction of the MVTR of the polymer are obtained, but increases over the transition point up to about 30 percent result in unexpectedly large reductions in the MVTR's of films and coatings compounded of the polymer and the ketone. The sharpness of the transition point is not known precisely and may be obvious only over a shift in ketone content of a percent or two. Although more accurate terminology may be possible, the term "transition point" is believed to be explained adequately herein for use in the appended claims. On account of the degradation of other properties of coatings and films and the slight gains in the reductions of MVTR, the use of greater than 30 percent of fatty ketone in the polyolefin-ketone mixture is not recommended. The critical percentages are not known with great accuracy since they apparently depend on the grade of the polyolefin and the exact chemical and physical characteristics of the ketone which are compounded together. For example, in manufacturing a particular higher fatty ketone commercially, the product may vary in melting point, viscosity, etc., from batch to batch and thus the ratio of polymer to ketone must be expressed, with respect to the minimum quantity required for outstanding results, in the approximate manner stated above.

The following table of examples lists many coating compositions comprising a polyethylene and a conventional moistureproofing agent which do not contain a higher fatty ketone. The purpose of these examples is to provide a basis of comparison with other examples which are based on polyethylene-ketone compositions. The examples which include a higher ketone illustrate the effect on the moisture vapor transmission by varying the polymer-ketone ratio. The test samples of all examples were prepared by dipping pieces of cellophane in coating solutions of 6 percent concentration of the mixture or single ingredient named in each example.

In the following examples, moisture vapor transmission rates were obtained by the General Foods Method (modified) in accordance with which a sample of a coated cellophane film is sealed over the open end of wax-coated standard cup containing calcium chloride as a desiccant. The cup and sample are thereafter placed in a cabinet in which the atmosphere is held at approximately 95 percent relative humidity and a temperature of 100° F. After a conditioning period of about 16 hours in this atmosphere to eliminate variations from such factors as surface moisture, the weight of the cup and sample is ascertained. The cup and sample are returned to the cabinet for the standard test period, such as 24 hours, after which the cup and sample are re-weighed for moisture pick-up by the calcium chloride.

The thickness of all coatings was measured and the MVTR of each sample was calculated first on the basis of such thickness and the moisture pick-up weight obtained, and then corrected to an MVTR value corresponding to a coating thickness of 0.2 mil.

The polyethylene identified below as "low density" was the conventional low-melting type (density, 0.92; melting point 105° C. to 110° C.) manufactured by the Bakelite Company. Polyethylene identified below as "high density" (density, 0.945; melting point about 135° C.) was manufactured as "Hy-Fax C-100" by the Hercules Powder Corporation. "Medium density" polyethylene (density, 0.93) was manufactured as "Alathon 34" by the E. I. du Pont de Nemours & Co.

*Examples 1 to 30*

| Example No. | Parts | Polyethylene Grade | Parts Moisture Transmission Reducing Material | MVTR Based on 0.2 Mil Thickness |
| --- | --- | --- | --- | --- |
| 1 | 100 | low density (0.92) | 0 | 120 |
| 2 | 95 | do | 5 parraffin (microcrystalline) | 97 |
| 3 | 95 | do | 5 parraffin (plate) | 87 |
| 4 | 90 | do | 10 parraffin (plate) | 85 |
| 5 | 80 | do | 20 parraffin (plate) | 98 |
| 6 | 75 | do | 25 parraffin (plate) | 93 |
| 7 | 95 | do | 5 parraffin (high M.P.) | 89 |
| 8 | 95 | do | 5 Castor Wax | 91 |
| 9 | 100 | do | 0 | 99 |
| 10 | 90 | do | 10 Stearone | 93 |
| 11 | 88 | do | 12 Stearone | 64 |
| 12 | 85 | do | 15 Stearone | 42 |
| 13 | 82 | do | 18 Stearone | 25 |
| 14 | 80 | do | 20 Stearone | 17.0 |
| 15 | 90 | do | 10 Myristone | 6.9 |
| 16 | 90 | do | 10 Laurone | 3.9 |
| 17 | 100 | high density (0.96) | 0 | 36 |
| 18 | 90 | do | 10 paraffin | 36 |
| 19 | 85 | do | 15 paraffin | 34 |
| 20 | 80 | do | 20 paraffin | 46 |
| 21 | 60 | do | 40 paraffin | 27 |
| 22 | 90 | do | 10 stearone | 27 |
| 23 | 100 Mixture | 50% high dens. / 50% low dens | 0 | 50 |
| 24 | 90 Mixture | 50% high dens. / 50% low dens | 10 stearone | 24 |
| 25 | 100 | Medium dens. (0.93) | 0 | 64 |
| 26 | 90 | do | 10 stearone | 68 |
| 27 | 88 | do | 12 stearone | 53 |
| 28 | 85 | do | 15 stearone | 46 |
| 29 | 80 | do | 20 stearone | 33 |
| 30 | 75 | do | 25 stearone | 26 |

From the above examples, it may be observed that mixing polyethylene with a number of well-known moistureproofing agents did not result in substantial reduction of MVTR values. For example, paraffin was added in various proportions up to 25 parts to 75 parts of polyethylene without much improvement in moisture vapor resistance; other properties, such as clarity, were adversely affected. However, the use of the ketones of this invention in all cases (all grades of polyethylene) in amounts of from 10 to 12 parts in 100 parts of polymer-ketone mixture resulted in unexpectedly large reductions of the MVTR's of the related samples. The data above, relating to examples in which the higher fatty ketone is used, indicates a critical level is reached in increasing the amount of ketone in the composition at some level within the range of 10 to 12 parts of ketone per 100 parts of the mixture above which MVTR may be reduced drastically with further increases in the percentage of ketone.

Various changes and modifications may be made in practicing the invention without departing from the spirit and scope thereof; for example, this invention can be used with heavier coatings (e.g. 2.0 mils) or with unsupported polyethylene films. On the other hand, other polyolefins can be substituted for the polyethylene of the preferred embodiment, e.g. polypropylene, polybutylene, etc., the former being of considerable interest as a coating or as an unsupported film.

The hydrophillic base utilized for the purposes of this invention may be a non-fibrous pellicle produced from any suitable water-insoluble hydrophillic film-forming material, such as regenerated cellulose, whether formed from viscose solutions, cuprammonium cellulose solutions or solutions of cellulose in organic or inorganic solvents, gelatin, casein, deacetylated chitin, water-insoluble polyvinyl alcohol, cellulose ethers which are insoluble in but swollen by water such as hydroxyethyl cellulose, water-insoluble alginate salts saran-type materials such as vinylidene chloride-acrylonitrile interpolymers, vinylidene chloride-alkyl acrylate or methacrylate interpolymers, vinylidene chloride-vinyl chloride interpolymers, etc. The pellicles may be in the form of films, sheets, tubing, bands or shaped hollow bodies or the hydrophillic base may be paper of any type including heavy duty kraft paper formed from or comprising cellulose fibers. Therefore, the invention is not to be limited except as defined in the appended claims.

The present application is a continuation-in-part of application Serial No. 601,617, filed August 2, 1956, now abandoned.

We claim:

1. A resinous composition having a low moisture vapor permeability comprising a polyolefin selected from the group consisting of polyethylene, polypropylene and polybutylene, and a higher alkyl ketone having the formula

wherein R and R' are alkyl radicals containing between 11 and 30 carbon atoms, the amount of said ketone being in the range of from about 10% up to 30% by weight of the composition.

2. The composition of claim 1 wherein the ketone is selected from the group consisting of stearone, laurone, myristone, behenone, cerotone, montanone and melissone.

3. The composition of claim 1 wherein the ketone is stearone and the polyolefin is polyethylene.

4. The composition of claim 1 wherein the ketone is laurone and the polyolefin is polyethylene.

5. The composition of claim 1 wherein the ketone is myristone and the polyolefin is polyethylene.

6. The composition of claim 1 wherein the ketone is stearone and the polyolefin is polypropylene.

7. The composition of claim 1 wherein said composition is a shaped article.

8. The composition of claim 1 wherein said composition is a self-sustaining film.

9. The composition of claim 1 wherein said composition is a coating on a non-fibrous, hydrophilic, water-insoluble cellulosic sheet.

10. A composition adapted for forming films and coatings which are characterized by unusually low moisture vapor transmission rates comprising from about 87 to 90% by weight of an organic solvent for a polyolefin selected from the group consisting of polyethylene and polypropylene, and from 3 to 10% by weight of a mixture dissolved in said solvent consisting essentially of a polyolefin selected from the group consisting of polyethylene and polypropylene, and a higher alkyl ketone having the following formula:

wherein R and R' are alkyl radicals containing 11 to 30 carbon atoms, said ketone being present in an amount of from about 10% up to 30% by weight of said mixture.

No references cited.